(12) United States Patent
Li et al.

(10) Patent No.: US 10,805,942 B1
(45) Date of Patent: Oct. 13, 2020

(54) MULTIPLEXING COMMUNICATIONS OF USER EQUIPMENT THAT SUPPORT DIFFERENT TRANSMISSION TIME INTERVAL LENGTHS

(71) Applicant: QUALCOMM Incorporated, San Diego, CA (US)

(72) Inventors: Junyi Li, Chester, NJ (US); Vasanthan Raghavan, West Windsor Township, NJ (US); Juergen Cezanne, Ocean Township, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/436,618

(22) Filed: Jun. 10, 2019

(51) Int. Cl.
*H04L 5/14* (2006.01)
*H04W 72/12* (2009.01)

(52) U.S. Cl.
CPC ......... *H04W 72/121* (2013.01); *H04L 5/1469* (2013.01); *H04W 72/1289* (2013.01)

(58) Field of Classification Search
CPC .... H04B 7/0695; H04B 7/0617; H04B 7/088; H04W 72/1205; H04W 72/1289; H04W 72/042; H04W 72/046
See application file for complete search history.

(56) References Cited

U.S. PATENT DOCUMENTS

| | | | |
|---|---|---|---|
| 2017/0318564 A1* | 11/2017 | Lee | H04L 5/001 |
| 2018/0076942 A1* | 3/2018 | Nory | H04L 5/0055 |
| 2018/0077719 A1* | 3/2018 | Nory | H04W 72/1278 |
| 2018/0205534 A1* | 7/2018 | Yi | H04L 5/1469 |
| 2018/0242264 A1* | 8/2018 | Pelletier | H04W 52/346 |
| 2018/0317250 A1* | 11/2018 | Yi | H04L 5/0082 |
| 2019/0123881 A1* | 4/2019 | Lee | H04W 72/0413 |
| 2019/0288801 A1* | 9/2019 | Yang | H04L 1/0038 |
| 2019/0342057 A1* | 11/2019 | Rico Alvarino | H04W 56/001 |
| 2020/0068557 A1* | 2/2020 | Lee | H04L 1/1812 |
| 2020/0107300 A1* | 4/2020 | Kwak | H04W 72/042 |
| 2020/0112974 A1* | 4/2020 | Sun | H04W 72/10 |
| 2020/0119853 A1* | 4/2020 | Hassan Hussein | H04L 1/1874 |

* cited by examiner

*Primary Examiner* — Asad M Nawaz
*Assistant Examiner* — Syed Ali
(74) *Attorney, Agent, or Firm* — Qualcomm Incorporated

(57) ABSTRACT

In some aspects, a user equipment (UE) may receive first downlink control information (DCI) scheduling a start of a data communication in a first transmission time interval (TTI) on a first frequency band configured with an uplink/downlink time division duplexing (TDD) pattern that is synchronized with a second frequency band. The UE may receive or transmit a first portion of the data communication in the first TTI based at least in part on receiving the first DCI. The UE may receive second DCI that schedules a second portion of the data communication in a second TTI on the first frequency band, the second DCI indicating that the second portion is part of the data communication. The UE may receive or transmit the second portion of the data communication in the second TTI based at least in part on receiving the second DCI.

51 Claims, 7 Drawing Sheets

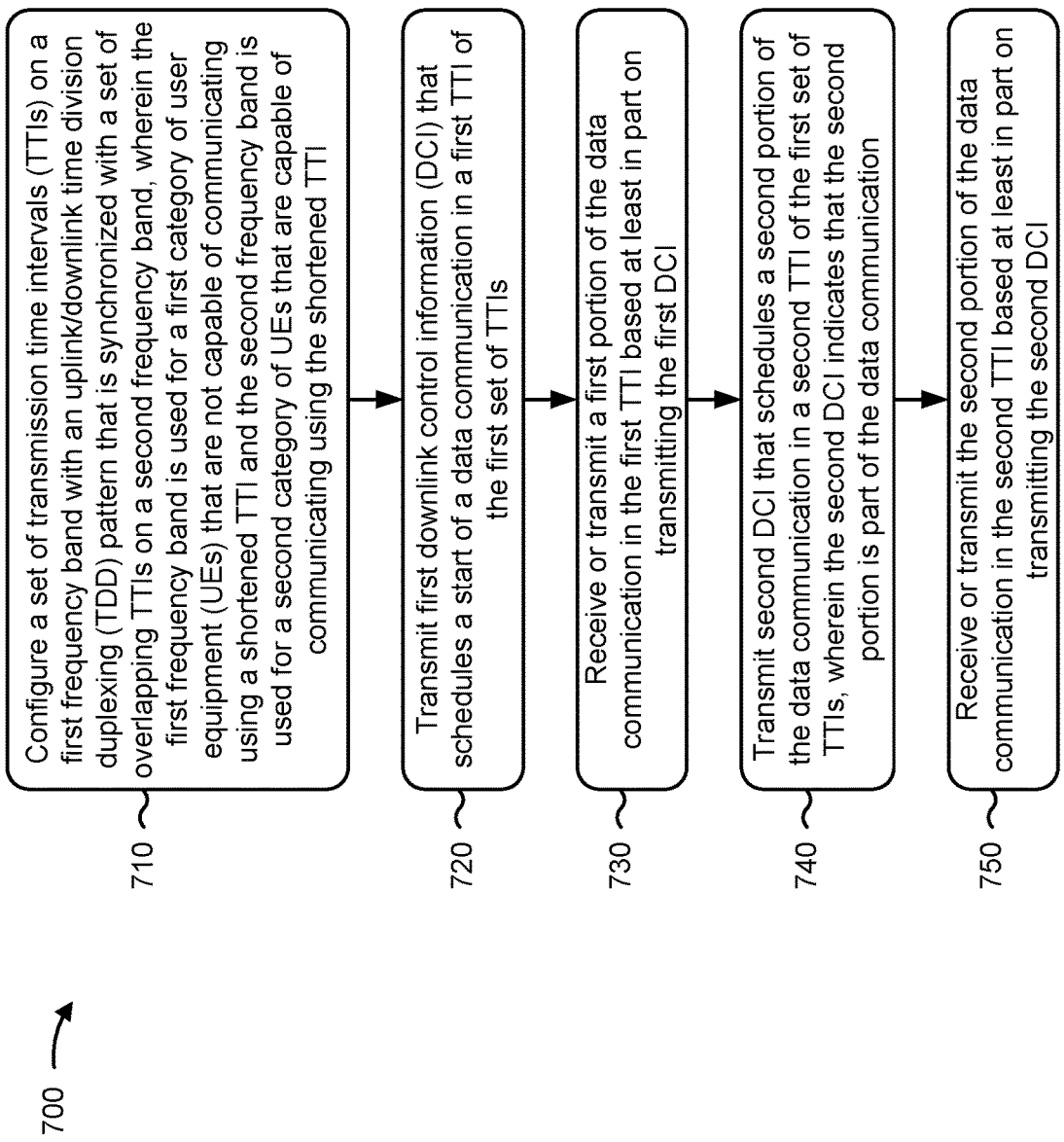

MULTIPLEXING COMMUNICATIONS OF USER EQUIPMENT THAT SUPPORT DIFFERENT TRANSMISSION TIME INTERVAL LENGTHS

FIELD OF THE DISCLOSURE

Aspects of the present disclosure generally relate to wireless communication and to techniques and apparatuses for multiplexing communications of user equipment that support different transmission time interval lengths.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include receiving first downlink control information (DCI) that schedules a start of a data communication in a first transmission time interval (TTI) on a first frequency band, wherein the first frequency band is configured with an uplink/downlink time division duplexing (TDD) pattern that is synchronized with a second frequency band; receiving or transmitting a first portion of the data communication in the first TTI based at least in part on receiving the first DCI; receiving second DCI that schedules a second portion of the data communication in a second TTI on the first frequency band, wherein the second DCI indicates that the second portion is part of the data communication; and receiving or transmitting the second portion of the data communication in the second TTI based at least in part on receiving the second DCI.

In some aspects, a method of wireless communication, performed by a base station, may include configuring a set of transmission time intervals (TTIs) on a first frequency band with an uplink/downlink TDD pattern that is synchronized with a set of overlapping TTIs on a second frequency band, wherein the first frequency band is used for a first category of UEs that are not capable of communicating using a shortened TTI and the second frequency band is used for a second category of UEs that are capable of communicating using the shortened TTI; transmitting first DCI that schedules a start of a data communication in a first TTI of the first set of TTIs; receiving or transmitting a first portion of the data communication in the first TTI based at least in part on transmitting the first DCI; transmitting second DCI that schedules a second portion of the data communication in a second TTI of the first set of TTIs, wherein the second DCI indicates that the second portion is part of the data communication; and receiving or transmitting the second portion of the data communication in the second TTI based at least in part on transmitting the second DCI.

In some aspects, a UE for wireless communication may include memory and one or more processors operatively coupled to the memory. The memory and the one or more processors may be configured to receive first DCI that schedules a start of a data communication in a first TTI on a first frequency band, wherein the first frequency band is configured with an uplink/downlink TDD pattern that is synchronized with a second frequency band; receive or transmit a first portion of the data communication in the first TTI based at least in part on receiving the first DCI; receive second DCI that schedules a second portion of the data communication in a second TTI on the first frequency band, wherein the second DCI indicates that the second portion is part of the data communication; and receive or transmit the second portion of the data communication in the second TTI based at least in part on receiving the second DCI.

In some aspects, a base station for wireless communication may include memory and one or more processors operatively coupled to the memory. The memory and the one or more processors may be configured to configure a set of TTIs on a first frequency band with an uplink/downlink TDD pattern that is synchronized with a set of overlapping TTIs on a second frequency band, wherein the first frequency band is used for a first category of UEs that are not capable of communicating using a shortened TTI and the second frequency band is used for a second category of UEs that are capable of communicating using the shortened TTI; transmit first DCI that schedules a start of a data communication in a first TTI of the first set of TTIs; receive or transmit a first portion of the data communication in the first TTI based at least in part on transmitting the first DCI; transmit second DCI that schedules a second portion of the data communication in a second TTI of the first set of TTIs, wherein the second DCI indicates that the second portion is part of the data communication; and receive or transmit the second portion of the data communication in the second TTI based at least in part on transmitting the second DCI.

In some aspects, a non-transitory computer-readable medium may store one or more instructions for wireless communication. The one or more instructions, when executed by one or more processors of a UE, may cause the one or more processors to: receive first DCI that schedules a start of a data communication in a first TTI on a first frequency band, wherein the first frequency band is configured with an uplink/downlink TDD pattern that is synchronized with a second frequency band; receive or transmit a first portion of the data communication in the first TTI based at least in part on receiving the first DCI; receive second DCI that schedules a second portion of the data communication in a second TTI on the first frequency band, wherein the second DCI indicates that the second portion is part of the data communication; and receive or transmit the second portion of the data communication in the second TTI based at least in part on receiving the second DCI.

In some aspects, a non-transitory computer-readable medium may store one or more instructions for wireless communication. The one or more instructions, when executed by one or more processors of a base station, may cause the one or more processors to: configure a set of TTIs on a first frequency band with an uplink/downlink TDD pattern that is synchronized with a set of overlapping TTIs on a second frequency band, wherein the first frequency band is used for a first category of UEs that are not capable of communicating using a shortened TTI and the second frequency band is used for a second category of UEs that are capable of communicating using the shortened TTI; transmit first DCI that schedules a start of a data communication in a first TTI of the first set of TTIs; receive or transmit a first portion of the data communication in the first TTI based at least in part on transmitting the first DCI; transmit second DCI that schedules a second portion of the data communication in a second TTI of the first set of TTIs, wherein the second DCI indicates that the second portion is part of the data communication; and receive or transmit the second portion of the data communication in the second TTI based at least in part on transmitting the second DCI.

In some aspects, an apparatus for wireless communication may include means for receiving first DCI that schedules a start of a data communication in a first TTI on a first frequency band, wherein the first frequency band is configured with an uplink/downlink TDD pattern that is synchronized with a second frequency band; means for receiving or transmitting a first portion of the data communication in the first TTI based at least in part on receiving the first DCI; means for receiving second DCI that schedules a second portion of the data communication in a second TTI on the first frequency band, wherein the second DCI indicates that the second portion is part of the data communication; and means for receiving or transmitting the second portion of the data communication in the second TTI based at least in part on receiving the second DCI.

In some aspects, an apparatus for wireless communication may include means for configuring a set of TTIs on a first frequency band with an uplink/downlink TDD pattern that is synchronized with a set of overlapping TTIs on a second frequency band, wherein the first frequency band is used for a first category of UEs that are not capable of communicating using a shortened TTI and the second frequency band is used for a second category of UEs that are capable of communicating using the shortened TTI; means for transmitting first DCI that schedules a start of a data communication in a first TTI of the first set of TTIs; means for receiving or transmitting a first portion of the data communication in the first TTI based at least in part on transmitting the first DCI; means for transmitting second DCI that schedules a second portion of the data communication in a second TTI of the first set of TTIs, wherein the second DCI indicates that the second portion is part of the data communication; and means for receiving or transmitting the second portion of the data communication in the second TTI based at least in part on transmitting the second DCI.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6 and 7 are diagrams illustrating example processes relating to multiplexing communications of UEs that support different transmission time interval lengths, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
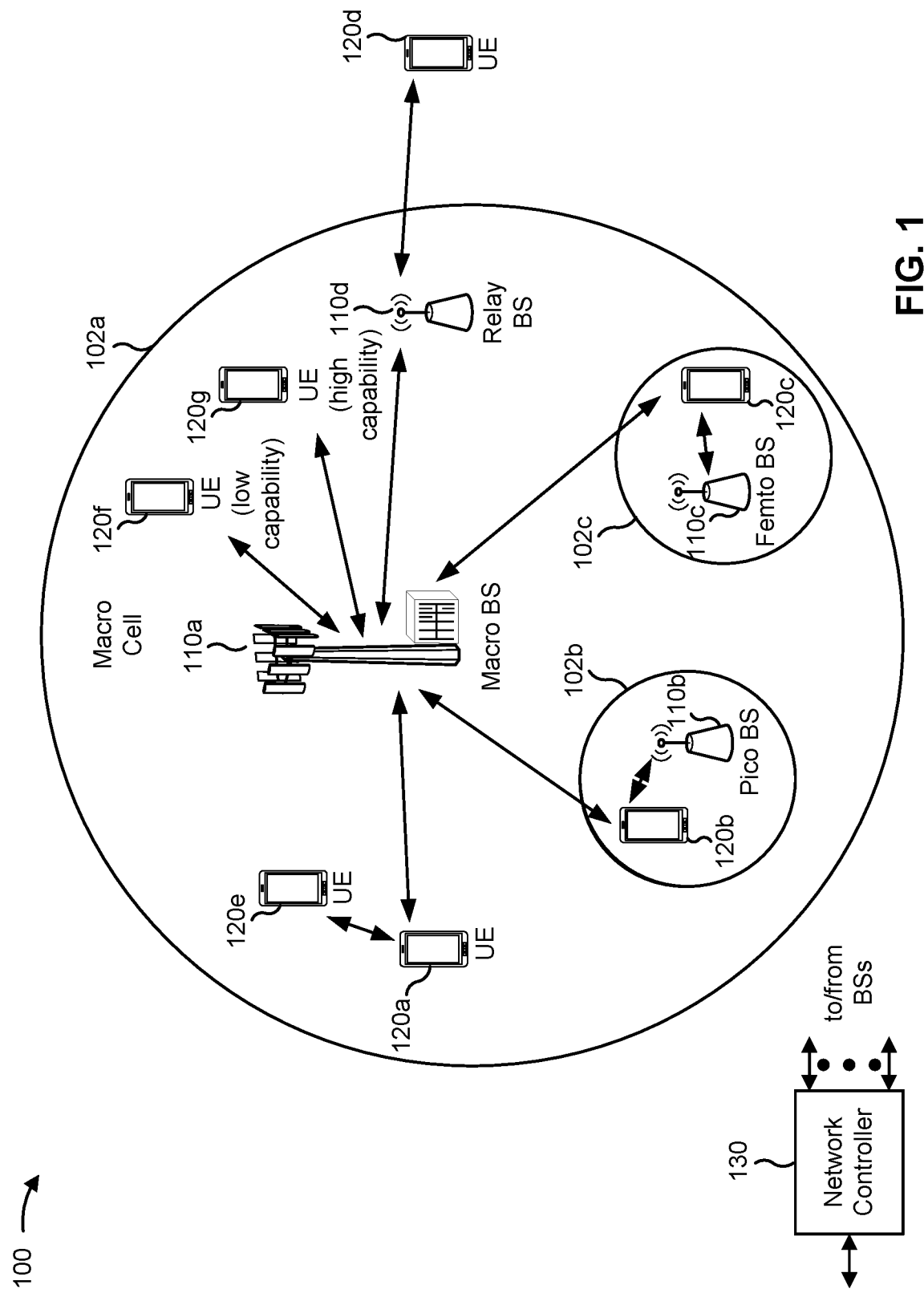
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of B Ss 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, a base station 110 may serve different UEs 120 of different categories, different UEs 120 that support different capabilities, and/or the like. For example, the base station 110 may serve a first UE 120f that has a less advanced capability (e.g., a lower capability) and a second UE 120g that has a more advanced capability (e.g., a higher capability). For example, the first UE 120f may be a first category of UE 120 (e.g., an NR-Lite UE) that is not capable of communicating using a shortened transmission time interval (TTI) (e.g., a slot length of 1 ms or less, 0.5 ms, 0.25 ms, 0.125 ms, 0.0625 ms, and/or the like, depending on a sub-carrier spacing), and the second UE 120g may be a second category of UE 120 (e.g., an NR UE) that is capable of communicating using the shortened TTI. Additionally, or alternatively, the first UE 120f may have a reduced feature set compared to the second UE 120g. In some aspects, the first UE 120f may include an MTC UE, and eMTC UE, an IoT UE, and/or the like, as described above.

As indicated above, FIG. 1 is provided as an example. Other examples may differ from what is described with regard to FIG. 1.

Figure 2:
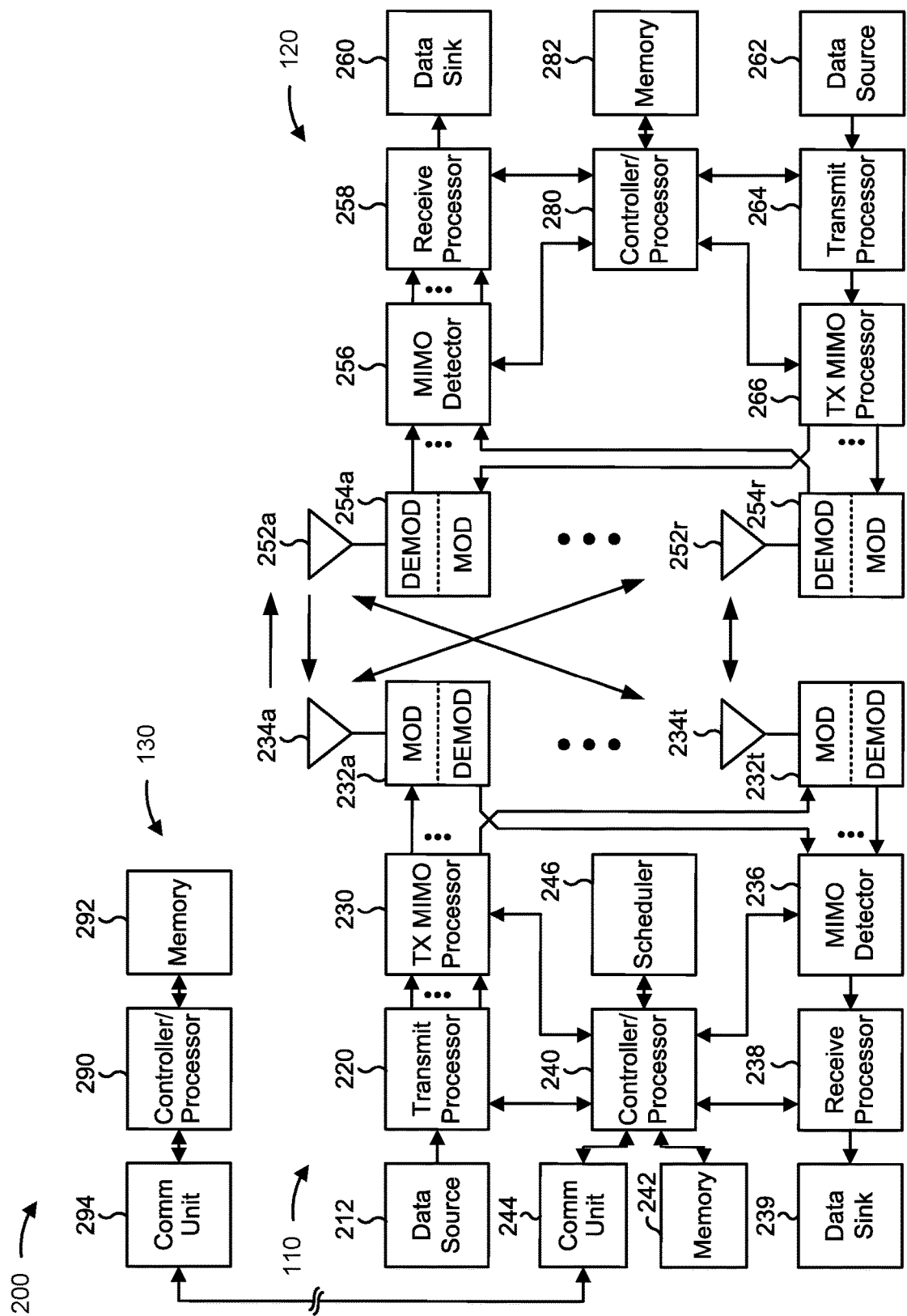
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where, in general, T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with multiplexing communications of UEs that support different transmission time interval lengths, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for receiving (e.g., using antenna 252, DEMOD 254, MIMO detector 256, receive processor 258, controller/processor 280, memory 282, and/or the like) first DCI that schedules a start of a data communication in a first TTI on a first frequency band, wherein the first frequency band is configured with an uplink/downlink TDD pattern that is synchronized with a second frequency band; means for receiving or transmitting (e.g., using controller/processor 280, transmit processor 264, TX MIMO processor 266, MOD 254, antenna 252, DEMOD 254, MIMO detector 256, receive processor 258, and/or the like) a first portion of the data communication in the first TTI based at least in part on receiving the first DCI; means for receiving (e.g., using antenna 252, DEMOD 254, MIMO detector 256, receive processor 258, controller/processor 280, memory 282, and/or the like) second DCI that schedules a second portion of the data communication in a second TTI on the first frequency band, wherein the second DCI indicates that the second portion is part of the data communication; means for receiving or transmitting (e.g., using controller/processor 280, transmit processor 264, TX MIMO processor 266, MOD 254, antenna 252, DEMOD 254, MIMO detector 256, receive processor 258, and/or the like) the second portion of the data communication in the second TTI based at least in part on receiving the second DCI; and/or the like. In some aspects, such means may include one or more components of UE 120 described in connection with FIG. 2, such as receive processor 258, transmit processor 264, controller/processor 280, memory 282, and/or the like.

In some aspects, base station 110 may include means for configuring (e.g., using controller/processor 240, memory 242, and/or the like) a set of TTIs on a first frequency band with an uplink/downlink TDD pattern that is synchronized with a set of overlapping TTIs on a second frequency band, wherein the first frequency band is used for a first category of UEs that are not capable of communicating using a shortened TTI and the second frequency band is used for a second category of UEs that are capable of communicating using the shortened TTI; means for transmitting (e.g., using controller/processor 240, transmit processor 220, TX MIMO processor 230, MOD 232, antenna 234, and/or the like) first DCI that schedules a start of a data communication in a first TTI of the first set of TTIs; means for receiving or transmitting (e.g., using antenna 234, DEMOD 232, MIMO detector 236, receive processor 238, controller/processor 240, transmit processor 220, TX MIMO processor 230, MOD 232, antenna 234, and/or the like) a first portion of the data communication in the first TTI based at least in part on transmitting the first DCI; means for transmitting (e.g., using controller/processor 240, transmit processor 220, TX MIMO processor 230, MOD 232, antenna 234, and/or the like) second DCI that schedules a second portion of the data communication in a second TTI of the first set of TTIs, wherein the second DCI indicates that the second portion is part of the data communication; means for receiving or transmitting (e.g., using antenna 234, DEMOD 232, MIMO detector 236, receive processor 238, controller/processor 240, transmit processor 220, TX MIMO processor 230, MOD 232, antenna 234, and/or the like) the second portion of the data communication in the second TTI based at least in part on transmitting the second DCI; and/or the like. In some aspects, such means may include one or more components of base station 110 described in connection with FIG. 2, such as transmit processor 220, receive processor 238, controller/processor 240, memory 242, and/or the like.

As indicated above, FIG. 2 is provided as an example. Other examples may differ from what is described with regard to FIG. 2.

Figure 3:
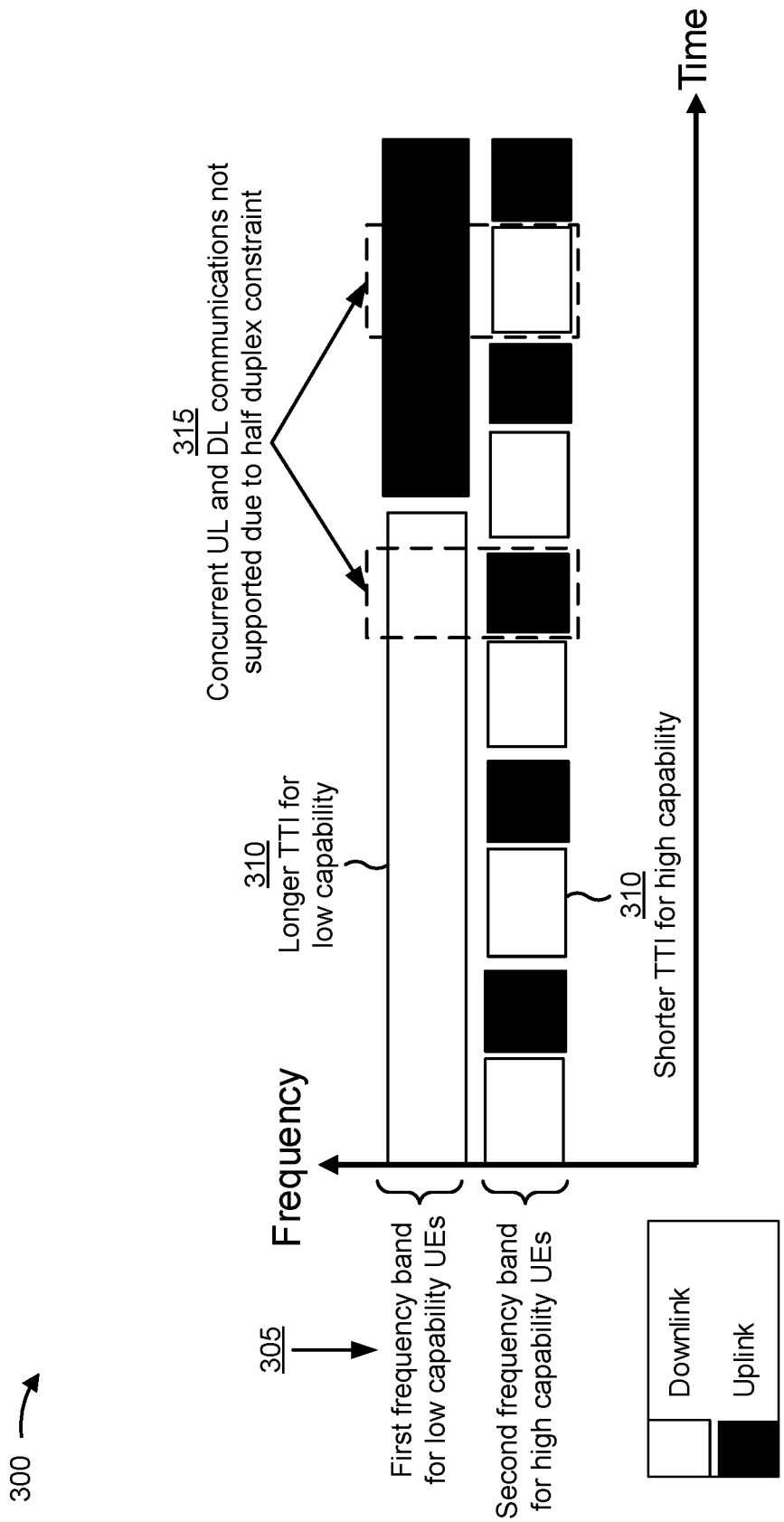
FIG. 3 is a diagram illustrating an example of different transmission time interval lengths for different frequency bands, in accordance with various aspects of the present disclosure.

FIG. 3 is a diagram illustrating an example 300 of different transmission time interval lengths for different frequency bands, in accordance with various aspects of the present disclosure.

As described above in connection with FIG. 1, in some aspects, a base station 110 may serve different UEs 120 of different categories, different UEs 120 that support different capabilities, and/or the like. For example, the base station 110 may serve a first category of UEs (such as UE 120f with reference to FIG. 1) that have a less advanced capability (e.g., a lower capability) and a second category of UEs (such as UE 120g with reference to FIG. 1) that have a more advanced capability (e.g., a higher capability). In this case, UEs of the first category may have a reduced feature set compared to UEs of the second category. For example, UEs of the first category may support a lower maximum modulation and coding scheme (MCS) than UEs of the second category (e.g., quadrature phase shift keying (QPSK) or the like as compared to 256-quadrature amplitude modulation (QAM) or the like), may support a lower transmit power than UEs of the second category, may have a less advanced beamforming capability than UEs of the second category, may be capable of communicating on a narrower maximum bandwidth part than UEs of the second category, and/or the like. In some cases, UEs of the second category may be capable of communicating using a shortened TTI (e.g., a slot length of 1 ms or less, 0.5 ms, 0.25 ms, 0.125 ms, 0.0625 ms, and/or the like, depending on a sub-carrier spacing), and UEs of the first category may not be capable of communicating using the shortened TTI.

To serve different UEs 120 of different categories and/or having different capabilities, a base station 110 may multiplex communications of the different UEs 120 in shared spectrum. In some cases, the base station 110 may use time division multiplexing (TDM), such as by allocating the entire spectrum to UEs of the first category, then to UEs of the second category, then back to UEs of the first category, and so on. However, this use of spectrum may be inefficient depending on the quantity of UEs 120 of different categories. Furthermore, some scenarios for NR support ultra-reliable low latency communication (URLLC) and other lower latency scenarios, and using TDM would increase the latency in such scenarios, making it more difficult to satisfy latency requirements (e.g., for UEs of the second category).

As shown in FIG. 3, and by reference number 305, the base station 110 may use frequency division multiplexing (FDM) to multiplex communications of the different UEs 120 in shared spectrum. For example, the base station 110 may allocate a first frequency band of the shared spectrum (e.g., a first portion of the shared spectrum) to UEs having a lower capability (e.g., a less advanced capability, such as UEs of the second category), and may allocate a second frequency band of the shared spectrum (e.g., a second portion of the shared spectrum) to UEs having a higher capability (e.g., a more advanced capability, such as UEs of the first category). Although FIG. 3 shows the first frequency band for UEs having the lower capability as having a higher frequency than the second frequency band for UEs having the higher capability, in some aspects, the first frequency band for UEs having the lower capability has a lower frequency than the second frequency band for UEs having the higher capability. As an example, the first frequency band may range from 6000 MHz to 6010 MHz, and the second frequency band may range from 6010 MHz to 6100 MHz.

In some aspects, the first frequency band for UEs having the lower capability may occupy less channel bandwidth and/or a lesser portion of a component carrier than the second frequency band for UEs having the higher capability. For example, the first frequency band for UEs having the lower capability may include 10% of the total channel bandwidth, while the second frequency band for UEs having the higher capability may include 90% of the total channel bandwidth. In one example component carrier of 100 MHz, this means that the first frequency band occupies, for example, 10 MHz and the second frequency band occupies 90 MHz, similar to the 6000 MHz to 6100 MHz example mentioned above. Other bandwidth partitions are possible, such as 20% versus 80%, 30% versus 70%, and/or the like. In some aspects, the first frequency band and the second frequency band may be in the same frequency range (FR). For example, the first frequency band and the second frequency band may both be in, or both be a designated band within, Frequency Range 1 (FR1, including sub-6 GHz bands, some of which can include bands used by previous standards, for example, LTE), Frequency Range (FR2, including frequency bands above 24 GHz), or the like.

As shown by reference number 310, UEs having the higher capability may be capable of communicating using a shorter TTI, whereas UEs having the lower capability may not be capable of communicating using a shorter TTI. For example, the minimum TTI length supported by UEs having the higher capability may be shorter than the minimum TTI length supported by UEs having the lower capability. Because a TTI may be configured for transmission of one of uplink data or downlink data, this may result in overlapping (e.g., concurrent) TTIs on different frequency bands having different configurations. For example, as shown by reference number 315, a TTI configured for downlink data (e.g., a downlink TTI) on the first frequency band may overlap with a TTI configured for uplink data (e.g., an uplink TTI) on the second frequency band, or an uplink TTI on the first frequency band may overlap with a downlink TTI on the second frequency band.

However, if the base station 110 is limited by a half duplex constraint, meaning that the base station 110 cannot concurrently transmit and receive communications, then the base station 110 may not be capable of concurrently transmitting a communication on the first frequency band and receiving a communication on the second frequency band, or vice versa. Some techniques and apparatuses described herein permit a base station 110, subject to a half duplex constraint, to use frequency division multiplexing to serve a first category UEs that are not capable of communicating using a shortened TTI and a second category of UEs that are capable of communicating using the shortened TTI. In this way, spectrum that is shared between UEs 120 of the different categories may be used efficiently. Furthermore, stricter requirement for UEs of the second category (e.g., URLLC requirements, low latency requirements, and/or the like) may be satisfied.

As indicated above, FIG. 3 is provided as an example. Other examples may differ from what is described with respect to FIG. 3.

Figure 4:
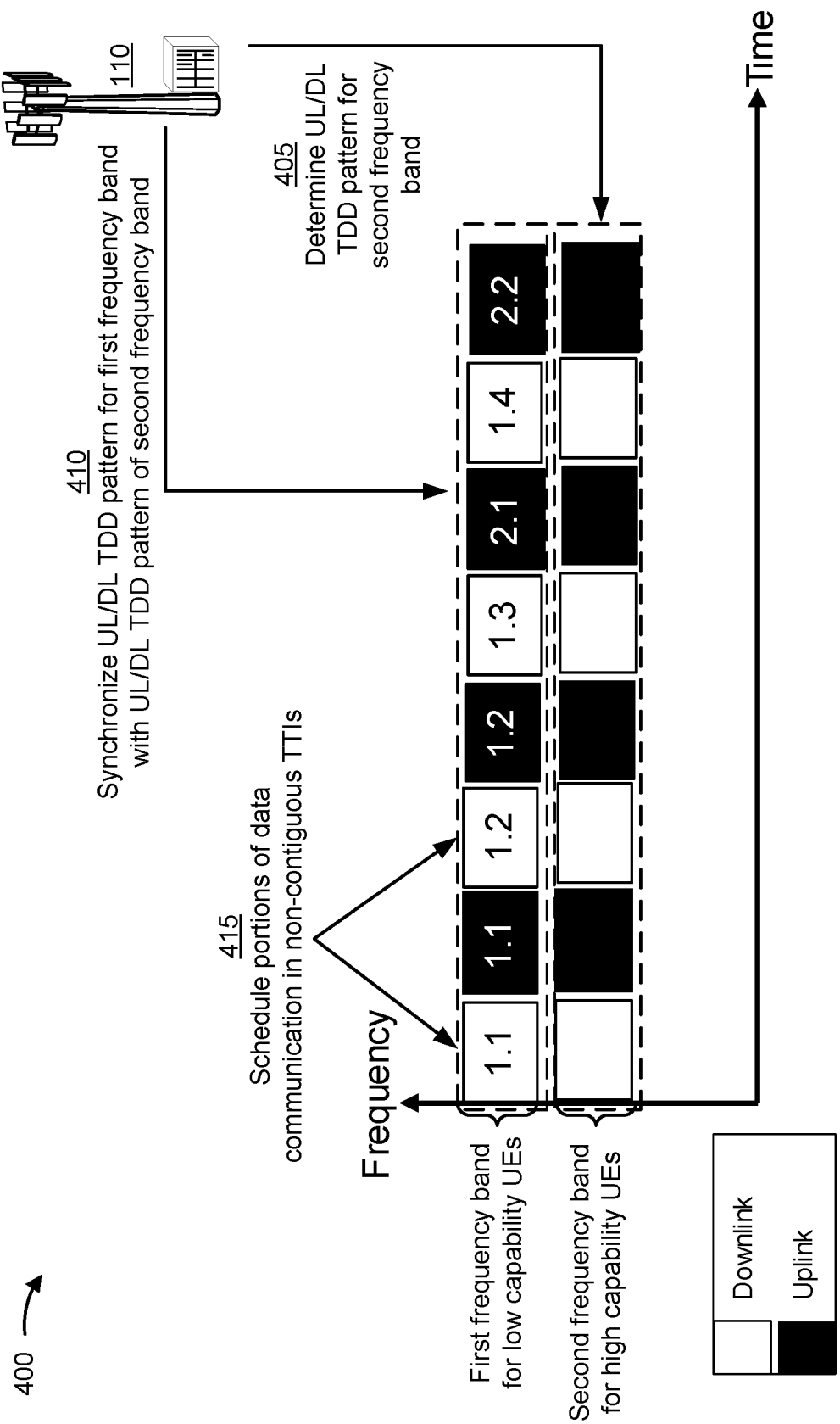
FIGS. 4 and 5 are diagrams illustrating examples of multiplexing communications of user equipment (UEs) that support different transmission time interval lengths, in accordance with various aspects of the present disclosure.

FIG. 4 is a diagram illustrating an example 400 of multiplexing communications of UEs that support different transmission time interval lengths, in accordance with various aspects of the present disclosure.

As shown in FIG. 4, shared frequency spectrum may be frequency division multiplexed for a first category of UEs that are not capable of communicating using a shortened TTI and a second category of UEs that are capable of communicating using the shortened TTI, as described above in connection with FIG. 3. For example, a first portion of the shared spectrum (e.g., a first frequency band) may be used for communications with the first category of UEs, and a second portion of the shared spectrum (e.g., a second frequency band) may be used for communications with the second category of UEs. In some aspects, the first category of UEs may have a reduced feature set compared to the second category of UEs.

As shown by reference number 405, a base station 110 may determine an uplink/downlink (UL/DL) time division duplexing (TDD) pattern configured for the second frequency band. An UL/DL TDD pattern may refer to a configuration of a set of TTIs for uplink data and downlink data, where a first subset of the set of TTIs may be configured for uplink data and a second subset of the set of TTIs may be configured for downlink data. In FIG. 4, the example UL/DL TDD pattern for the second frequency band shows a first TTI configured for downlink data, a second TTI configured for uplink data, a third TTI configured for downlink data, and so on, with contiguous TTIs alternating between uplink data and downlink data. This UL/DL TDD pattern is shown as an example, and a different UL/DL TDD pattern may be used.

In some aspects, the UL/DL TDD pattern for the second frequency band may be fixed (e.g., semi-statically configured, such as in a radio resource control (RRC) configuration message). In this case, the base station 110 may determine the fixed UL/DL TDD pattern (e.g., based at least in part on an UL/DL TDD pattern indicated in an RRC message). Alternatively, the UL/DL TDD pattern for the second frequency band may be dynamically determined over time, such as based at least in part on a traffic load. In this case, the base station 110 may dynamically determine the UL/DL TDD pattern over time, as the UL/DL TDD pattern is configured. In some aspects, a semi-statically configured UL/DL TDD pattern (e.g., configured in an RRC message) may be dynamically overridden (e.g., via one or more downlink control information (DCI) messages).

As shown by reference number 410, the base station 110 may synchronize an UL/DL TDD pattern for the first frequency band (e.g., a first UL/DL TDD pattern) with the UL/DL TDD pattern determined for the second frequency band (e.g., a second UL/DL TDD pattern). For example, the base station 110 may synchronize the UL/DL TDD patterns by configuring a set of TTIs on the first frequency band with an UL/DL TDD pattern that is synchronized with a set of overlapping TTIs on a second frequency band. Thus, the base station 110 may configure a TTI on the first frequency band for downlink data if a corresponding TTI on the second frequency band is configured for downlink data. Similarly, the base station 110 may configure a TTI on the first frequency band for uplink data if a corresponding TTI on the second frequency band is configured for uplink data. The corresponding TTI on the second frequency band may overlap with the TTI on the first frequency band, which may include a full overlap when the TTIs are time-aligned.

As shown by reference number 415, the base station 110 may schedule portions of a data communication (e.g., an uplink communication or a downlink communication) in non-contiguous TTIs on the first frequency band. For example, because TTIs on the first frequency band may be configured with a shorter TTI length than that supported by the first category of UEs, the base station 110 may configure a data communication on the first frequency band to be divided into multiple portions that are transmitted over multiple TTIs. In this way, a lower capability UE may be capable of transmitting or receiving data communications using a TTI length that is shorter than a minimum TTI length supported by the lower capability UE, and the base station 110 may be capable of frequency division multiplexing communications of UEs having the lower capability and UEs having a higher capability (e.g., that supports a shorter TTI length).

As indicated above, FIG. 4 is provided as an example. Other examples may differ from what is described with respect to FIG. 4.

Figure 5:
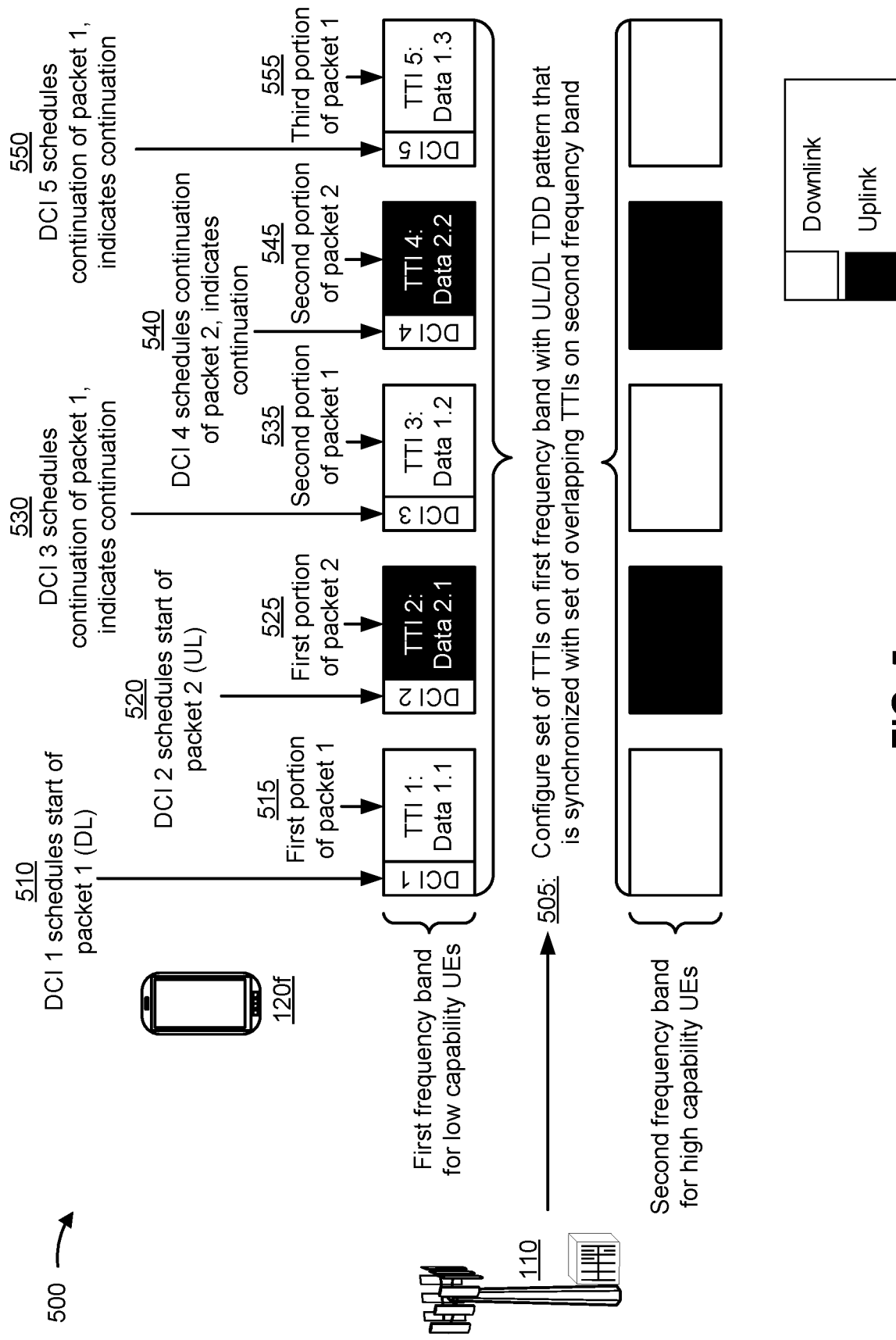

FIG. 5 is a diagram illustrating another example 500 of multiplexing communications of UEs that support different transmission time interval lengths, in accordance with various aspects of the present disclosure.

As shown in FIG. 5, a base station 110 and a UE 120 (e.g., UE 120*f* having a lower capability, as shown in FIG. 1) may communicate with one another. The base station 110 may serve a first category of UEs that are not capable of communicating using a shortened TTI and may serve a second category of UEs that are capable of communicating using the shortened TTI. As described above, a first frequency band may be used to communicate with UEs of the first category, and a second frequency band may be used to communicate with UEs of the second category. The UE 120*f* shown in FIG. 5 may be a UE of the first category, and may communicate with the base station 110 using the first frequency band. Thus, the UE 120*f* may have a reduced feature set as compared to UEs (e.g., UEs 120*g* as per FIG. 1) that communicate with the base station 110 using the second frequency band. Although the UE 120*f* is shown as a smartphone, in some aspects, the UE 120*f* may be an MTC UE, and eMTC UE, an IoT UE, and/or the like, as described above in connection with FIG. 1.

As shown by reference number 505, the base station 110 may configure a set of TTIs on the first frequency band with an UL/DL TDD pattern that is synchronized with a set of overlapping TTIs on a second frequency band, as described above in connection with FIG. 4. For example, the base station 110 may configure a TTI on the first frequency band for downlink data if a corresponding TTI (e.g., that overlaps with the TTI) on the second frequency band is configured for downlink data, or may configure the TTI for uplink data if the corresponding TTI is configured for uplink data.

In some aspects, the base station 110 may indicate the UL/DL TDD pattern for the first frequency band to the UE 120*f*. For example, the base station 110 may transmit a configuration message (e.g., a radio resource control (RRC) message and/or the like) that indicates the UL/DL TDD pattern for the first frequency band. The base station 110 may indicate the UL/DL TDD pattern for the first frequency band in the configuration message when, for example, the UL/DL TDD pattern for the second frequency band is fixed and/or is semi-statically configured (e.g., in the RRC message).

Additionally, or alternatively, the base station 110 may indicate the UL/DL TDD pattern for the first frequency band (or a part of the UL/DL TDD pattern) in DCI. For example, the DCI may indicate whether a TTI, corresponding to the DCI (e.g., a TTI for which a data communication is scheduled by the DCI), is configured for uplink data or downlink data. The base station 110 may indicate the UL/DL TDD pattern for the first frequency band (e.g., for one or more TTIs) in DCI when, for example, the UL/DL TDD pattern for the second frequency band is dynamically configured (e.g., in DCI). In some aspects, the base station 110 may use both a configuration message and DCI to indicate the UL/DL TDD pattern, such as by indicating a semi-static UL/DL TDD pattern using the configuration message and by overriding parts of the UL/DL TDD pattern (e.g., an UL/DL configuration for one or more TTIs) using DCI.

As shown by reference number 510, the base station 110 may transmit, and the UE 120*f* may receive, downlink control information (DCI) (shown as DCI 1) that schedules a start of a data communication in a TTI of the configured set of TTIs (e.g., on the first frequency band), shown as TTI 1. In FIG. 5, this data communication is shown as packet 1, and is a downlink data communication. In example 500, DCI 1 schedules the start of packet 1 to occur in a same TTI in which DCI 1 is transmitted (shown as TTI 1), such as by indicating a timing value of zero in DCI 1. The timing value may be a physical downlink control channel (PDCCH) to physical downlink shared channel (PDSCH) timing value (e.g., a k0 value) for a downlink data communication, or may be a PDCCH to physical uplink shared channel (PUSCH) timing value (e.g., a k2 value) for an uplink data communication. This timing value is shown as an example, and other timing values may be used. Thus, the DCI and the data communication may occur in different TTIs.

As shown by reference number 515, the base station 110 may transmit, and the UE 120*f* may receive, a first portion of the downlink data communication (packet 1) in TTI 1, as scheduled by DCI 1. In FIG. 5, the first portion of packet 1 is shown as Data 1.1, to indicate a first portion of a first packet in TTI 1. In some aspects, the UE 120*f* may store the first portion in a buffer until all portions of the first packet are received.

As shown by reference number 520, the base station 110 may transmit, and the UE 120*f* may receive, DCI 2 that schedules a start of a data communication in another TTI of the configured set of TTIs (e.g., on the first frequency band), shown as TTI 2. In FIG. 5, this data communication is shown as packet 2, and is an uplink data communication. In example 500, DCI 2 schedules the start of packet 2 to occur in a same TTI in which DCI 2 is transmitted (shown as TTI 2), such as by indicating a timing value of zero in DCI 2. As described above, other timing values may be used, and the DCI and the data communication may occur in different TTIs.

As shown by reference number 525, the UE 120*f* may transmit, and the base station 110 may receive, a first portion of the uplink data communication (packet 2) in TTI 2, as scheduled by DCI 2. In FIG. 5, the first portion of packet 2 is shown as Data 2.1, to indicate a first portion of a second packet in TTI 2. In some aspects, the base station 110 may store the first portion in a buffer until all portions of the second packet are received.

As shown by reference number 530, the base station 110 may transmit, and the UE 120*f* may receive, DCI 3 that schedules a second portion (e.g., a continuation) of the downlink data communication in a TTI of the configured set of TTIs (e.g., on the first frequency band), shown as TTI 3. In example 500, DCI 3 schedules the second portion of packet 1 to occur in a same TTI in which DCI 3 is transmitted (shown as TTI 3), but a different PDCCH-to-PDSCH timing may be used. As shown, DCI 3 may indicate that the communication scheduled by DCI 3 is a continuation of a previous downlink data communication. For example, DCI 3 may indicate that the second portion, scheduled by DCI 3, is part of the downlink data communication scheduled by DCI 1. In some aspects, this indication may be a single bit that indicates whether a communication scheduled by DCI 3 is part of a prior data communication. In this case, a first value of the bit (e.g., 1) may indicate that the communication scheduled by DCI 3 is part of a prior data communication (e.g., in this case, packet 1, which is a prior downlink data communication), and a second value of the bit (e.g., 0) may indicate that the communication scheduled by DCI 3 is not part of a prior data communication (e.g., is a start of a new downlink data communication).

In some aspects, DCI (e.g., a first DCI) that schedules a start (e.g., a first portion) of a data communication (e.g., DCI 1 of FIG. 5) may have a first DCI format, and DCI (e.g., a subsequent DCI, a second DCI, a third DCI, and/or the like) that schedules a continuation (e.g., a second portion, a third portion, and so on) of the data communication (e.g., DCI 3 of FIG. 5) may have a second, different DCI format. For example, DCI having the first DCI format may indicate that the first TTI is for either uplink data or downlink data, a UE identifier of the UE 120*f*, a modulation and coding scheme (MCS) for the data communication, a resource allocation for the data communication, and/or the like. In some aspects, DCI having the second DCI format may exclude an MCS and/or a resource allocation. Additionally, or alternatively, DCI having the second DCI format may indicate that a communication scheduled by such DCI is a continuation of a previous data communication, may indicate whether a communication scheduled by such DCI is the last portion of a data communication, and/or the like (and such information may not be included in DCI having the first DCI format).

In some aspects, DCI that schedules a continuation of a data communication may indicate whether a TTI, in which the continuation is scheduled, is configured for uplink data or downlink data in conformity with the first DCI. This may enable the UE 120*f* to determine that the second DCI schedules the second portion of the data communication. In this way, the UE 120*f* may transmit or receive data appropriately. For example, if the DCI indicates that the TTI is configured for uplink data, then the UE 120*f* may continue a data communication by transmitting a portion of an uplink data communication. Similarly, if the DCI indicates that the TTI is configured for downlink data, then the UE 120*f* may continue a data communication by receiving a portion of a downlink data communication. Additionally, or alternatively, the UE 120*f* may refrain from monitoring a TTI based at least in part on whether the TTI is configured for uplink data or downlink data, which may be determined based at least in part on the indication in DCI. For example, if any given DCI indicates that a corresponding TTI is configured for uplink data and the UE 120*f* is not in the process of transmitting uplink data (e.g., does not have data stored in a buffer for uplink transmission), then the UE 120*f* may refrain from monitoring (e.g., may skip) the TTI. Similarly, if any given DCI indicates that a corresponding TTI is configured for downlink data and the UE 120*f* is not in the process of receiving downlink data (e.g., has not received any portions of a downlink data communication), then the UE 120*f* may refrain from monitoring (e.g., may skip) the TTI.

As shown by reference number 535, the base station 110 may transmit, and the UE 120*f* may receive, the second portion of the downlink data communication (packet 1) in TTI 3, as scheduled by DCI 3. Thus, different portions of a data communication (e.g., an uplink data communication or a downlink data communication) may be scheduled in non-contiguous TTIs (e.g., TTI 1 and TTI 3). In FIG. 5, the second portion of packet 1 is shown as Data 1.2, to indicate a second portion of a first packet in TTI 3. In some aspects, the UE 120*f* may store the second portion in a buffer until all portions of the first packet are received.

As shown by reference number 540, the base station 110 may transmit, and the UE 120*f* may receive, DCI 4 that schedules a second portion (e.g., a continuation) of the uplink data communication in a TTI of the configured set of TTIs (e.g., on the first frequency band), shown as TTI 4. In example 500, DCI 4 schedules the second portion of packet 2 to occur in a same TTI in which DCI 4 is transmitted (shown as TTI 4), but a different PDCCH-to-PUSCH timing may be used. As shown, DCI 4 may indicate that the communication scheduled by DCI 4 is a continuation of a previous uplink data communication. For example, DCI 4 may indicate that the second portion, scheduled by DCI 4, is part of the uplink data communication scheduled by DCI 2. In some aspects, this indication may be a single bit that indicates whether a communication scheduled by DCI 4 is part of a prior data communication. In this case, a first value of the bit (e.g., 1) may indicate that the communication scheduled by DCI 4 is part of a prior data communication (e.g., in this case, packet 2, which is a prior uplink data communication), and a second value of the bit (e.g., 0) may indicate that the communication scheduled by DCI 4 is not part of a prior data communication (e.g., is a start of a new uplink data communication).

In some aspects, DCI that schedules a continuation of a data communication may indicate whether a TTI, in which the continuation is scheduled, includes a last portion of the data communication (e.g., may indicate whether a portion of the data communication, scheduled by the DCI, is a last portion of the data communication). In this way, the UE 120*f* or the base station 110 may combine received communications for decoding, demodulation, and/or the like. For example, if the DCI indicates that a scheduled portion is the last portion of a downlink data communication, then the UE 120*f* may decode and/or demodulate the downlink data communication upon reception of the scheduled portion (e.g., by combining that portion with other portions received by the UE 120*f*). Similarly, if the DCI indicates that a scheduled portion is the last portion of an uplink data communication, then the base station 110 may decode and/or demodulate the uplink data communication upon reception of the scheduled portion (e.g., by combining that portion with other portions received by the base station 110).

In some aspects, DCI that schedules a start of a data communication (e.g., a first portion of the data communication) may indicate a number of TTIs that include corresponding portions of the data communication. For example, the DCI may include an MCS that indicates the number of TTIs. In some aspects, the MCS may indicate a block size (e.g., a transport block (TB) size) that indicates the number of TTIs. In this case, DCI that schedules a continuation of the data communication may exclude an indication of whether a portion scheduled by that DCI is a last portion because the UE 120*f* would be able to determine that the portion is the last portion based at least in part on the indicated number of TTIs. Alternatively, in some aspects, the MCS may not indicate the block size and/or the number of TTIs. In this case, DCI that schedules a continuation of the data communication may include an indication of whether a portion scheduled by that DCI is a last portion so that the UE 120*f* can determine whether the portion is the last portion.

As shown by reference number 545, the UE 120*f* may transmit, and the base station 110 may receive, the second portion of the uplink data communication (packet 2) in TTI 4, as scheduled by DCI 4. Thus, different portions of a data communication (e.g., an uplink data communication or a downlink data communication) may be scheduled in non-contiguous TTIs (e.g., TTI 2 and TTI 4). In FIG. 5, the second portion of packet 2 is shown as Data 2.2, to indicate a second portion of a second packet in TTI 4. In some aspects, the base station 110 may store the second portion in a buffer until all portions of the second packet are received. In example 500, the second portion of the uplink data communication is the last portion, which may be indicated by DCI 2 (e.g., using an MCS that indicates that the uplink data communication spans two TTIs) and/or by DCI 4 (e.g., using a bit that indicates that the second portion is the last portion). Thus, upon receiving the second portion, the base station 110 may process the uplink data communication.

As shown by reference number 550, the base station 110 may transmit, and the UE 120*f* may receive, DCI 5 that schedules a third portion (e.g., a continuation) of the downlink data communication in a TTI of the configured set of TTIs (e.g., on the first frequency band), shown as TTI 5. In example 500, DCI 5 schedules the third portion of packet 1 to occur in a same TTI in which DCI 5 is transmitted (shown as TTI 5), but a different PDCCH-to-PDSCH timing may be used. As shown, DCI 5 may indicate that the communication scheduled by DCI 5 is a continuation of a previous downlink data communication. For example, DCI 5 may indicate that the third portion, scheduled by DCI 5, is part of the downlink data communication scheduled by DCI 1 (and DCI 3), in a similar manner as described above. In some aspects, DCI 1 and/or DCI 5 may indicate that the third portion is the last portion of the downlink data communication, as described above.

In some aspects, the UE 120*f* may monitor for DCI in a TTI on the first frequency band based at least in part on a determination that a previously-received portion of a data communication is not the last portion of the data communication. For example, as described above, the base station 110 may indicate whether a scheduled portion of a data communication is a last portion of the data communication. When a portion scheduled by a TTI is not the last portion, the UE 120*f* may continue to monitor for DCI on subsequent TTIs until the last portion is scheduled and/or received. In example 500, the UE 120*f* may determine that the second portion of packet 1 is not the last portion (e.g., due to an indication in DCI 1 and/or DCI 3). In this case, the UE 120*f* may monitor for DCI in TTI 5.

As shown by reference number 555, the base station 110 may transmit, and the UE 120*f* may receive, the third portion of the downlink data communication (packet 1) in TTI 5, as scheduled by DCI 5. In FIG. 5, the third portion of packet 1 is shown as Data 1.3, to indicate a third portion of a first packet in TTI 5. In some aspects, the UE 120*f* may store the second portion in a buffer until all portions of the first packet are received. In example 500, the third portion of the downlink data communication is the last portion, which may be indicated by DCI 1 (e.g., using an MCS that indicates that the downlink data communication spans three TTIs) and/or by DCI 5 (e.g., using a bit that indicates that the third portion is the last portion). Thus, upon receiving the third portion, the UE 120*f* may process the uplink data communication.

As indicated above, FIG. 5 is provided as an example. Other examples may differ from what is described with respect to FIG. 5.

Figure 6:
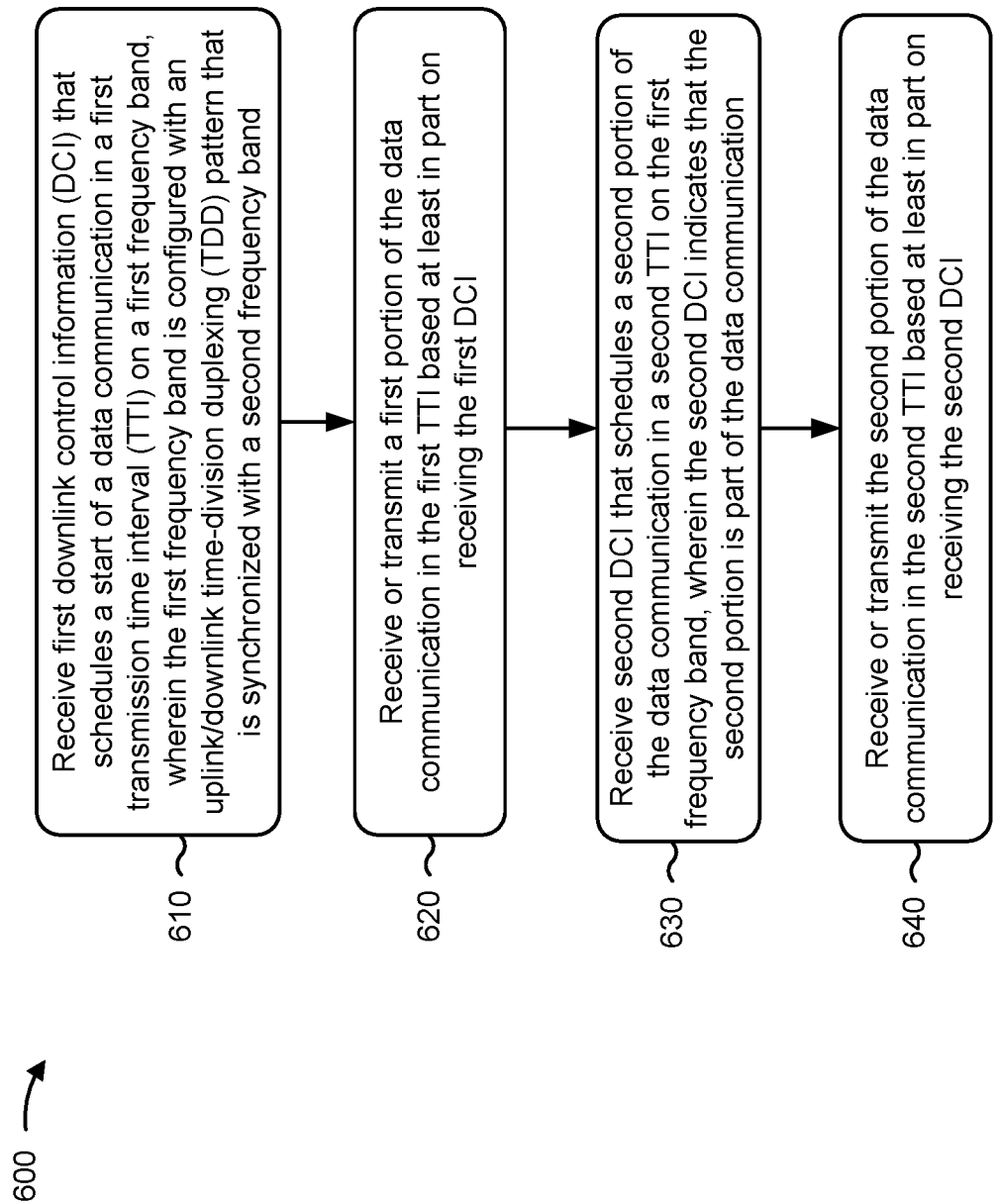

FIG. 6 is a diagram illustrating an example process 600 performed, for example, by a UE, in accordance with various aspects of the present disclosure. Example process 600 is an example where a UE (e.g., UE 120, UE 120*f*, and/or the like) performs operations associated with multiplexing communications of UEs that support different TTI lengths.

As shown in FIG. 6, in some aspects, process 600 may include receiving first downlink control information (DCI) that schedules a start of a data communication in a first transmission time interval (TTI) on a first frequency band, wherein the first frequency band is configured with an uplink/downlink time division duplexing (TDD) pattern that is synchronized with a second frequency band (block 610). For example, the UE (e.g., using receive processor 258, controller/processor 280, memory 282, and/or the like) may receive first DCI that schedules a start of a data communication in a first TTI on a first frequency band, as described above in connection with FIGS. 4 and 5. In some aspects, the first frequency band is configured with an UL/DL TDD pattern that is synchronized with a second frequency band.

As further shown in FIG. 6, in some aspects, process 600 may include receiving or transmitting a first portion of the data communication in the first TTI based at least in part on receiving the first DCI (block 620). For example, the UE (e.g., using receive processor 258, transmit processor 264, controller/processor 280, memory 282, and/or the like) may receive or transmit a first portion of the data communication in the first TTI based at least in part on receiving the first DCI, as described above in connection with FIGS. 4 and 5.

As further shown in FIG. 6, in some aspects, process 600 may include receiving second DCI that schedules a second portion of the data communication in a second TTI on the first frequency band, wherein the second DCI indicates that the second portion is part of the data communication (block 630). For example, the UE (e.g., using receive processor 258, controller/processor 280, memory 282, and/or the like) may receive second DCI that schedules a second portion of the data communication in a second TTI on the first frequency band, as described above in connection with FIGS. 4 and 5. In some aspects, the second DCI indicates that the second portion is part of the data communication.

As further shown in FIG. 6, in some aspects, process 600 may include receiving or transmitting the second portion of the data communication in the second TTI based at least in part on receiving the second DCI (block 640). For example, the UE (e.g., using receive processor 258, transmit processor 264, controller/processor 280, memory 282, and/or the like) may receive or transmit the second portion of the data communication in the second TTI based at least in part on receiving the second DCI, as described above in connection with FIGS. 4 and 5.

Process 600 may include additional aspects, such as any single aspect or any combination of aspects described below and/or in connection with one or more other processes described elsewhere herein.

In a first aspect, the second DCI further indicates whether the second portion is a last portion of the data communication.

In a second aspect, alone or in combination with the first aspect, the second DCI has a different format than the first DCI.

In a third aspect, alone or in combination with one or more of the first and second aspects, the first DCI includes an indication of one of uplink data or downlink data, a UE identifier of the UE, an MCS for the data communication, and a resource allocation for the data communication, and wherein the second DCI indicates the one of uplink data or downlink data in conformity with the first DCI to enable the UE to determine that the second DCI schedules the second portion of the data communication.

In a fourth aspect, alone or in combination with one or more of the first through third aspects, the MCS indicates a number of TTIs that include corresponding portions of the data communication and the second DCI excludes an indication of whether the second portion is a last portion of the data communication.

In a fifth aspect, alone or in combination with one or more of the first through fourth aspects, the MCS does not indicate a number of TTIs that include corresponding portions of the data communication and the second DCI includes an indication of whether the second portion is a last portion of the data communication.

In a sixth aspect, alone or in combination with one or more of the first through fifth aspects, the first TTI and the second TTI are non-contiguous.

In a seventh aspect, alone or in combination with one or more of the first through sixth aspects, the first frequency band is used for a first category of UEs that are not capable of communicating using a shortened TTI, and the second frequency band is used for a second category of UEs that are capable of communicating using the shortened TTI.

In an eighth aspect, alone or in combination with one or more of the first through seventh aspects, the UE has a reduced feature set compared to UEs that communicate using the second frequency band.

In a ninth aspect, alone or in combination with one or more of the first through eighth aspects, the data communication is a downlink data communication, receiving or transmitting the first portion comprises receiving the first portion, and receiving or transmitting the second portion comprises receiving the second portion.

In a tenth aspect, alone or in combination with one or more of the first through ninth aspects, the data communication is an uplink data communication, receiving or transmitting the first portion comprises transmitting the first portion, and receiving or transmitting the second portion comprises transmitting the second portion.

In an eleventh aspect, alone or in combination with one or more of the first through tenth aspects, process 600 includes monitoring for third DCI on the first frequency band based at least in part on a determination that the second portion is not a last portion of the data communication.

In a twelfth aspect, alone or in combination with one or more of the first through eleventh aspects, the uplink/downlink TDD pattern is indicated in a configuration message received by the UE.

In a thirteenth aspect, alone or in combination with one or more of the first through twelfth aspects, the first DCI indicates whether the first TTI is configured for uplink data or downlink data, and the second DCI indicates whether the second TTI is configured for uplink data or downlink data in conformity with the first DCI.

In a fourteenth aspect, alone or in combination with one or more of the first through thirteenth aspects, the data communication is for one of uplink data or downlink data, and the UE is configured to refrain from monitoring a TTI configured for the other of uplink data or downlink data.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a base station, in accordance with various aspects of the present disclosure. Example process 700 is an example where a base station (e.g., base station 110 and/or the like) performs operations associated with multiplexing communications of UEs that support different TTI lengths.

As shown in FIG. 7, in some aspects, process 700 may include configuring a set of transmission time intervals (TTIs) on a first frequency band with an uplink/downlink time division duplexing (TDD) pattern that is synchronized with a set of overlapping TTIs on a second frequency band, wherein the first frequency band is used for a first category of user equipment (UEs) that are not capable of communicating using a shortened TTI and the second frequency band is used for a second category of UEs that are capable of communicating using the shortened TTI (block 710). For example, the base station (e.g., using transmit processor 220, controller/processor 240, memory 242, and/or the like) may configure a set of TTIs on a first frequency band with an UL/DL TDD pattern that is synchronized with a set of overlapping TTIs on a second frequency band, as described above in connection with FIGS. 4 and 5. In some aspects, the first frequency band is used for a first category of UEs that are not capable of communicating using a shortened TTI and the second frequency band is used for a second category of UEs that are capable of communicating using the shortened TTI.

As further shown in FIG. 7, in some aspects, process 700 may include transmitting first downlink control information (DCI) that schedules a start of a data communication in a first TTI of the first set of TTIs (block 720). For example, the base station (e.g., using transmit processor 220, controller/processor 240, memory 242, and/or the like) may transmit first DCI that schedules a start of a data communication in a first TTI of the first set of TTIs, as described above in connection with FIGS. 4 and 5.

As further shown in FIG. 7, in some aspects, process 700 may include receiving or transmitting a first portion of the data communication in the first TTI based at least in part on transmitting the first DCI (block 730). For example, the base station (e.g., using transmit processor 220, receive processor 238, controller/processor 240, memory 242, and/or the like) may receive or transmit a first portion of the data communication in the first TTI based at least in part on transmitting the first DCI, as described above in connection with FIGS. 4 and 5.

As further shown in FIG. 7, in some aspects, process 700 may include transmitting second DCI that schedules a second portion of the data communication in a second TTI of the first set of TTIs, wherein the second DCI indicates that the second portion is part of the data communication (block 740). For example, the base station (e.g., using transmit processor 220, controller/processor 240, memory 242, and/or the like) may transmit second DCI that schedules a second portion of the data communication in a second TTI of the first set of TTIs, as described above in connection with FIGS. 4 and 5. In some aspects, the second DCI indicates that the second portion is part of the data communication.

As further shown in FIG. 7, in some aspects, process 700 may include receiving or transmitting the second portion of the data communication in the second TTI based at least in part on transmitting the second DCI (block 750). For example, the base station (e.g., using transmit processor 220, receive processor 238, controller/processor 240, memory 242, and/or the like) may receive or transmit the second portion of the data communication in the second TTI based at least in part on transmitting the second DCI, as described above in connection with FIGS. 4 and 5.

Process 700 may include additional aspects, such as any single aspect or any combination of aspects described below and/or in connection with one or more other processes described elsewhere herein.

In a first aspect, the first TTI is configured for downlink data if a corresponding TTI, in the set of overlapping TTIs, that overlaps with the first TTI is configured for downlink data, or the first TTI is configured for uplink data if the corresponding TTI is configured for uplink data.

In a second aspect, alone or in combination with the first aspect, the second DCI further indicates whether the second portion is a last portion of the data communication.

In a third aspect, alone or in combination with one or more of the first and second aspects, the second DCI has a different format than the first DCI.

In a fourth aspect, alone or in combination with one or more of the first through third aspects, the first DCI includes an indication of one of uplink data or downlink data, a UE identifier of the UE, an MCS for the data communication, and a resource allocation for the data communication, and wherein the second DCI indicates the one of uplink data or downlink data in conformity with the first DCI to enable the UE to determine that the second DCI schedules the second portion of the data communication.

In a fifth aspect, alone or in combination with one or more of the first through fourth aspects, the MCS indicates a number of slots that include portions of the data communication and the second DCI excludes an indication of whether the second portion is a last portion of the data communication.

In a sixth aspect, alone or in combination with one or more of the first through fifth aspects, the MCS does not indicate a number of slots that include portions of the data communication and the second DCI includes an indication of whether the second portion is a last portion of the data communication.

In a seventh aspect, alone or in combination with one or more of the first through sixth aspects, the first TTI and the second TTI are non-contiguous.

In an eighth aspect, alone or in combination with one or more of the first through seventh aspects, the data communication is a downlink data communication, receiving or transmitting the first portion comprises transmitting the first portion, and receiving or transmitting the second portion comprises transmitting the second portion.

In a ninth aspect, alone or in combination with one or more of the first through eighth aspects, the data communication is an uplink data communication, receiving or transmitting the first portion comprises receiving the first portion, and receiving or transmitting the second portion comprises receiving the second portion.

In a tenth aspect, alone or in combination with one or more of the first through ninth aspects, process 700 includes transmitting a configuration message that indicates the uplink/downlink TDD pattern.

In an eleventh aspect, alone or in combination with one or more of the first through tenth aspects, the first DCI indicates whether the first TTI is configured for uplink data or downlink data, and the second DCI indicates whether the second TTI is configured for uplink data or downlink data in conformity with the first DCI.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving first downlink control information (DCI) that schedules a start of a data communication in a first transmission time interval (TTI) on a first frequency band, wherein
      the first frequency band is configured with an uplink/downlink time division duplexing (TDD) pattern that is synchronized with a second frequency band,
      the first frequency band is used for a first category of UEs that are not capable of communicating using a shortened TTI,
      the second frequency band is used for a second category of UEs that are capable of communicating using the shortened TTI, and
      the first DCI includes an indication of one of uplink data or downlink data, a UE identifier of the UE, a modulation and coding scheme (MCS) for the data communication, and a resource allocation for the data communication;
   receiving or transmitting a first portion of the data communication in the first TTI based at least in part on receiving the first DCI;
   receiving second DCI that schedules a second portion of the data communication in a second TTI on the first frequency band, wherein
      the second DCI indicates that the second portion is part of the data communication,
      the second DCI indicates the one of uplink data or downlink data in conformity with the first DCI to enable the UE to determine that the second DCI schedules the second portion of the data communication, and
      the MCS indicates a number of TT's that include corresponding portions of the data communication and the second DCI excludes an indication of whether the second portion is a last portion of the data communication; and
   receiving or transmitting the second portion of the data communication in the second TTI based at least in part on receiving the second DCI.

2. The method of claim 1, wherein the second DCI further indicates whether the second portion is a last portion of the data communication.

3. The method of claim 1, wherein the second DCI has a different format than the first DCI.

4. The method of claim 1, wherein the first TTI and the second TTI are non-contiguous.

5. The method of claim 1, wherein the UE has a reduced feature set compared to UEs that communicate using the second frequency band.

6. The method of claim 1, wherein the data communication is a downlink data communication, wherein receiving or transmitting the first portion comprises receiving the first portion, and wherein receiving or transmitting the second portion comprises receiving the second portion.

7. The method of claim 1, wherein the data communication is an uplink data communication, wherein receiving or transmitting the first portion comprises transmitting the first portion, and wherein receiving or transmitting the second portion comprises transmitting the second portion.

8. The method of claim 1, further comprising monitoring for third DCI on the first frequency band based at least in part on a determination that the second portion is not a last portion of the data communication.

9. The method of claim 1, further comprising receiving a configuration message that indicates the uplink/downlink TDD pattern.

10. The method of claim 1, wherein the first DCI indicates whether the first TTI is configured for uplink data or downlink data, and wherein the second DCI indicates whether the second TTI is configured for uplink data or downlink data in conformity with the first DCI.

11. The method of claim 1, wherein the data communication is for one of uplink data or downlink data, and wherein the method further comprises refraining from monitoring a TTI configured for the other of uplink data or downlink data.

12. A method of wireless communication performed by a base station, comprising:
   configuring a set of transmission time intervals (TTIs) on a first frequency band with an uplink/downlink time division duplexing (TDD) pattern that is synchronized with a set of overlapping TTIs on a second frequency band, wherein the first frequency band is used for a first category of user equipment (UEs) that are not capable of communicating using a shortened TTI and the second frequency band is used for a second category of UEs that are capable of communicating using the shortened TTI;
   transmitting first downlink control information (DCI) that schedules a start of a data communication in a first TTI of the first set of TTIs, wherein the first DCI includes an indication of one of uplink data or downlink data, a UE identifier of the UE, a modulation and coding scheme (MCS) for the data communication, and a resource allocation for the data communication;
   receiving or transmitting a first portion of the data communication in the first TTI based at least in part on transmitting the first DCI;
   transmitting second DCI that schedules a second portion of the data communication in a second TTI of the first set of TTIs, wherein
      the second DCI indicates that the second portion is part of the data communication,
      the second DCI indicates the one of uplink data or downlink data in conformity with the first DCI to enable the UE to determine that the second DCI schedules the second portion of the data communication, and
      the MCS indicates a number of TTIs that include corresponding portions of the data communication and the second DCI excludes an indication of whether the second portion is a last portion of the data communication; and receiving or transmitting the second portion of the data communication in the second TTI based at least in part on transmitting the second DCI.

13. The method of claim 12, further comprising:
configuring the first TTI for downlink data if a corresponding TTI, in the set of overlapping TTIs, that overlaps with the first TTI is configured for downlink data; or
configuring the first TTI for uplink data if the corresponding TTI that overlaps with the first TTI is configured for uplink data.

14. The method of claim 12, wherein the second DCI further indicates whether the second portion is a last portion of the data communication.

15. The method of claim 12, wherein the second DCI has a different format than the first DCI.

16. The method of claim 12, wherein the first DCI includes an indication of one of uplink data or downlink data, a UE identifier of the UE, a modulation and coding scheme (MCS) for the data communication, and a resource allocation for the data communication, and wherein the second DCI indicates the one of uplink data or downlink data in conformity with the first DCI to enable the UE to determine that the second DCI schedules the second portion of the data communication.

17. The method of claim 12, wherein the first TTI and the second TTI are non-contiguous.

18. The method of claim 12, wherein the data communication is a downlink data communication, wherein receiving or transmitting the first portion comprises transmitting the first portion, and wherein receiving or transmitting the second portion comprises transmitting the second portion.

19. The method of claim 12, wherein the data communication is an uplink data communication, wherein receiving or transmitting the first portion comprises receiving the first portion, and wherein receiving or transmitting the second portion comprises receiving the second portion.

20. The method of claim 12, further comprising transmitting a configuration message that indicates the uplink/downlink TDD pattern.

21. The method of claim 12, wherein the first DCI indicates whether the first TTI is configured for uplink data or downlink data, and wherein the second DCI indicates whether the second TTI is configured for uplink data or downlink data in conformity with the first DCI.

22. A user equipment (UE) for wireless communication, comprising:
a memory; and
one or more processors operatively coupled to the memory, the memory and the one or more processors configured to:
receive first downlink control information (DCI) that schedules a start of a data communication in a first transmission time interval (TTI) on a first frequency band, wherein
the first frequency band is configured with an uplink/downlink time division duplexing (TDD) pattern that is synchronized with a second frequency band,
the first frequency band is used for a first category of UEs that are not capable of communicating using a shortened TTI,
the second frequency band is used for a second category of UEs that are capable of communicating using the shortened TTI, and
the first DCI includes an indication of one of uplink data or downlink data, a UE identifier of the UE,
a modulation and coding scheme (MCS) for the data communication, and a resource allocation for the data communication;
receive or transmit a first portion of the data communication in the first TTI based at least in part on receiving the first DCI;
receive second DCI that schedules a second portion of the data communication in a second TTI on the first frequency band, wherein
the second DCI indicates that the second portion is part of the data communication,
the second DCI indicates the one of uplink data or downlink data in conformity with the first DCI to enable the UE to determine that the second DCI schedules the second portion of the data communication, and
the MCS indicates a number of TT's that include corresponding portions of the data communication and the second DCI excludes an indication of whether the second portion is a last portion of the data communication; and
receive or transmit the second portion of the data communication in the second TTI based at least in part on receiving the second DCI.

23. The UE of claim 22, wherein the second DCI has a different format than the first DCI.

24. The UE of claim 22, wherein the UE has a reduced feature set compared to UEs that communicate using the second frequency band.

25. The UE of claim 22, wherein the one or more processors are further configured to monitor for third DCI on the first frequency band based at least in part on a determination that the second portion is not a last portion of the data communication.

26. The UE of claim 22, wherein the one or more processors are further configured to receive a configuration message that indicates the uplink/downlink TDD pattern.

27. The UE of claim 22, wherein the data communication is for one of uplink data or downlink data, and wherein the one or more processors are further configured to refrain from monitoring a TTI configured for the other of uplink data or downlink data.

28. A base station for wireless communication, comprising:
a memory; and
one or more processors operatively coupled to the memory, the memory and the one or more processors configured to:
configure a set of transmission time intervals (TTIs) on a first frequency band with an uplink/downlink time division duplexing (TDD) pattern that is synchronized with a set of overlapping TTIs on a second frequency band, wherein the first frequency band is used for a first category of user equipment (UEs) that are not capable of communicating using a shortened TTI and the second frequency band is used for a second category of UEs that are capable of communicating using the shortened TTI;
transmit first downlink control information (DCI) that schedules a start of a data communication in a first TTI of the first set of TTIs, wherein the first DCI includes an indication of one of uplink data or downlink data, a UE identifier of the UE, a modulation and coding scheme (MCS) for the data communication, and a resource allocation for the data communication;

receive or transmit a first portion of the data communication in the first TTI based at least in part on transmitting the first DCI;

transmit second DCI that schedules a second portion of the data communication in a second TTI of the first set of TTIs, wherein the second DCI indicates that the second portion is part of the data communication, the second DCI indicates the one of uplink data or downlink data in conformity with the first DCI to enable the UE to determine that the second DCI schedules the second portion of the data communication, and the MCS indicates a number of TTIs that include corresponding portions of the data communication and the second DCI excludes an indication of whether the second portion is a last portion of the data communication; and receive or transmit the second portion of the data communication in the second TTI based at least in part on transmitting the second DCI.

29. The base station of claim 28, wherein the one or more processors are further configured to configure the first TTI for downlink data if a corresponding TTI, in the set of overlapping TTIs, that overlaps with the first TTI is configured for downlink data, or to configure the first TTI for uplink data if the corresponding TTI that overlaps with the first TTI is configured for uplink data.

30. The base station of claim 28, wherein the second DCI has a different format than the first DCI.

31. The base station of claim 28, wherein the one or more processors are further configured to transmit a configuration message that indicates the uplink/downlink TDD pattern.

32. A non-transitory computer-readable medium storing one or more instructions for wireless communication, the one or more instructions comprising:

one or more instructions that, when executed by one or more processors of a user equipment (UE), cause the one or more processors to:

receive first downlink control information (DCI) that schedules a start of a data communication in a first transmission time interval (TTI) on a first frequency band, wherein the first frequency band is configured with an uplink/downlink time division duplexing (TDD) pattern that is synchronized with a second frequency band, the first frequency band is used for a first category of UEs that are not capable of communicating using a shortened TTI, the second frequency band is used for a second category of UEs that are capable of communicating using the shortened TTI, and the first DCI includes an indication of one of uplink data or downlink data, a UE identifier of the UE, a modulation and coding scheme (MCS) for the data communication, and a resource allocation for the data communication;

receive or transmit a first portion of the data communication in the first TTI based at least in part on receiving the first DCI;

receive second DCI that schedules a second portion of the data communication in a second TTI on the first frequency band, wherein the second DCI indicates that the second portion is part of the data communication, the second DCI indicates the one of uplink data or downlink data in conformity with the first DCI to enable the UE to determine that the second DCI schedules the second portion of the data communication, and the MCS indicates a number of TT's that include corresponding portions of the data communication and the second DCI excludes an indication of whether the second portion is a last portion of the data communication; and receive or transmit the second portion of the data communication in the second TTI based at least in part on receiving the second DCI.

33. The non-transitory computer-readable medium of claim 32, wherein the second DCI has a different format than the first DCI.

34. The non-transitory computer-readable medium of claim 32, wherein the UE has a reduced feature set compared to UEs that communicate using the second frequency band.

35. The non-transitory computer-readable medium of claim 32, wherein the one or more instructions further cause the one or more processors to monitor for third DCI on the first frequency band based at least in part on a determination that the second portion is not a last portion of the data communication.

36. The non-transitory computer-readable medium of claim 32, wherein the one or more instructions further cause the one or more processors to receive a configuration message that indicates the uplink/downlink TDD pattern.

37. The non-transitory computer-readable medium of claim 32, wherein the data communication is for one of uplink data or downlink data, and wherein the one or more instructions further cause the one or more processors to refrain from monitoring a TTI configured for the other of uplink data or downlink data.

38. A non-transitory computer-readable medium storing one or more instructions for wireless communication, the one or more instructions comprising:

one or more instructions that, when executed by one or more processors of a base station, cause the one or more processors to:

configure a set of transmission time intervals (TTIs) on a first frequency band with an uplink/downlink time division duplexing (TDD) pattern that is synchronized with a set of overlapping TTIs on a second frequency band, wherein the first frequency band is used for a first category of user equipment (UEs) that are not capable of communicating using a shortened TTI and the second frequency band is used for a second category of UEs that are capable of communicating using the shortened TTI;

transmit first downlink control information (DCI) that schedules a start of a data communication in a first TTI of the first set of TTIs, wherein the first DCI includes an indication of one of uplink data or downlink data, a UE identifier of the UE, a modulation and coding scheme (MCS) for the data communication, and a resource allocation for the data communication;

receive or transmit a first portion of the data communication in the first TTI based at least in part on transmitting the first DCI;

transmit second DCI that schedules a second portion of the data communication in a second TTI of the first set of TTIs, wherein the second DCI indicates that the second portion is part of the data communication,
the second DCI indicates the one of uplink data or downlink data in conformity with the first DCI to enable the UE to determine that the second DCI schedules the second portion of the data communication, and
the MCS indicates a number of TTIs that include corresponding portions of the data communication and the second DCI excludes an indication of whether the second portion is a last portion of the data communication; and
receive or transmit the second portion of the data communication in the second TTI based at least in part on transmitting the second DCI.

39. The non-transitory computer-readable medium of claim 38, wherein the one or more instructions further cause the one or more processors to configure the first TTI for downlink data if a corresponding TTI, in the set of overlapping TTIs, that overlaps with the first TTI is configured for downlink data, or to configure the first TTI for uplink data if the corresponding TTI that overlaps with the first TTI is configured for uplink data.

40. The non-transitory computer-readable medium of claim 38, wherein the second DCI has a different format than the first DCI.

41. The non-transitory computer-readable medium of claim 38, wherein the one or more instructions further cause the one or more processors to transmit a configuration message that indicates the uplink/downlink TDD pattern.

42. An apparatus for wireless communication, comprising:
means for receiving first downlink control information (DCI) that schedules a start of data communication in a first transmission time interval (TTI) on a first frequency band, wherein
the first frequency band is configured with an uplink/downlink time division duplexing (TDD) pattern that is synchronized with a second frequency band,
the first frequency band is used for a first category of UEs that are not capable of communicating using a shortened TTI,
the second frequency band is used for a second category of UEs that are capable of communicating using the shortened TTI, and
the first DCI includes an indication of one of uplink data or downlink data, a UE identifier of the UE, a modulation and coding scheme (MCS) for the data communication, and a resource allocation for the data communication;
means for receiving or transmitting a first portion of the data communication in the first TTI based at least in part on receiving the first DCI;
means for receiving second DCI that schedules a second portion of the data communication in a second TTI on the first frequency band, wherein
the second DCI indicates that the second portion is part of the data communication,
the second DCI indicates the one of uplink data or downlink data in conformity with the first DCI to enable the UE to determine that the second DCI schedules the second portion of the data communication, and
the MCS indicates a number of TT's that include corresponding portions of the data communication and the second DCI excludes an indication of whether the second portion is a last portion of the data communication; and
means for receiving or transmitting the second portion of the data communication in the second TTI based at least in part on receiving the second DCI.

43. The apparatus of claim 42, wherein the second DCI has a different format than the first DCI.

44. The apparatus of claim 42, wherein the UE has a reduced feature set compared to UEs that communicate using the second frequency band.

45. The apparatus of claim 42, further comprising means for monitoring for third DCI on the first frequency band based at least in part on a determination that the second portion is not a last portion of the data communication.

46. The apparatus of claim 42, further comprising means for receiving a configuration message that indicates the uplink/downlink TDD pattern.

47. The apparatus of claim 42, wherein the data communication is for one of uplink data or downlink data, and wherein the apparatus further comprises means for refraining from monitoring a TTI configured for the other of uplink data or downlink data.

48. An apparatus for wireless communication, comprising:
means for configuring a set of transmission time intervals (TTIs) on a first frequency band with an uplink/downlink time division duplexing (TDD) pattern that is synchronized with a set of overlapping TTIs on a second frequency band, wherein the first frequency band is used for a first category of user equipment (UEs) that are not capable of communicating using a shortened TTI and the second frequency band is used for a second category of UEs that are capable of communicating using the shortened TTI;
means for transmitting first downlink control information (DCI) that schedules a start of a data communication in a first TTI of the first set of TTIs, wherein the first DCI includes an indication of one of uplink data or downlink data, a UE identifier of the UE, a modulation and coding scheme (MCS) for the data communication, and a resource allocation for the data communication;
means for receiving or transmitting a first portion of the data communication in the first TTI based at least in part on transmitting the first DCI;
means for transmitting second DCI that schedules a second portion of the data communication in a second TTI of the first set of TTIs, wherein
the second DCI indicates that the second portion is part of the data communication,
the second DCI indicates the one of uplink data or downlink data in conformity with the first DCI to enable the UE to determine that the second DCI schedules the second portion of the data communication, and
the MCS indicates a number of TT's that include corresponding portions of the data communication and the second DCI excludes an indication of whether the second portion is a last portion of the data communication; and
means for receiving or transmitting the second portion of the data communication in the second TTI based at least in part on transmitting the second DCI.

49. The apparatus of claim 48, further comprising means for configuring the first TTI for downlink data if a corresponding TTI, in the set of overlapping TTIs, that overlaps with the first TTI is configured for downlink data, or means for configuring the first TTI for uplink data if the corresponding TTI that overlaps with the first TTI is configured for uplink data.

50. The apparatus of claim 48, wherein the second DCI has a different format than the first DCI.

51. The apparatus of claim 48, further comprising means for transmitting a configuration message that indicates the uplink/downlink TDD pattern.

* * * * *